United States Patent

[11] 3,540,509

| [72] | Inventor | Charles E. Gutshall<br>Roselle, Illinois |
|---|---|---|
| [21] | Appl. No. | 783,481 |
| [22] | Filed | Dec. 13, 1968 |
| [45] | Patented | Nov. 17, 1970 |
| [73] | Assignee | Illinois Tool Works Inc.<br>Chicago, Illinois<br>a corporation of Delaware |

[54] FASTENER DEVICE
6 Claims, 10 Drawing Figs.

[52] U.S. Cl. .................................................. 151/37, 151/39
[51] Int. Cl. .............................................. F16b 39/32
[50] Field of Search .......................................... 151/13, 11, 37, 39, 40, 41, 48

[56] References Cited
UNITED STATES PATENTS

| 920,947 | 5/1909 | Gilmore .................... | 151/39 |
| 3,385,341 | 5/1968 | Garstkiewicz .............. | 151/39 |
| 3,430,673 | 3/1969 | Rapata ...................... | 151/37 |

FOREIGN PATENTS

| 1,079,488 | 8/1967 | Great Britain ............... | 151/13 |

Primary Examiner—Marion Parsons, Jr.
Attorney—Robert W. Beart, Michael Kovac, Barry L. Clark and Jack R. Halvorsen ABSTRACT: A fastener comprising a novel clamping arrangement between a rotary threaded fastener member and a lockwasher whereby an even ratchet type action is attained thereby providing a smooth, progressive tightening by torque operated drivers and also providing a markedly improved resistance for such type fasteners to unauthorized loosening.

Patented Nov. 17, 1970
3,540,509
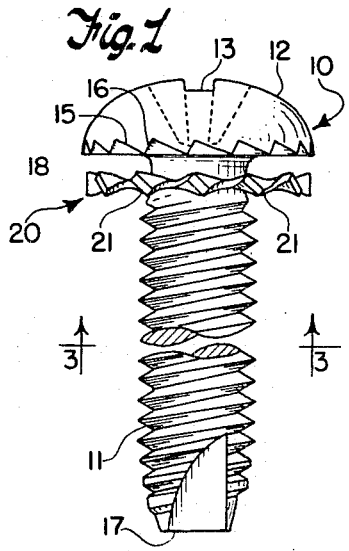
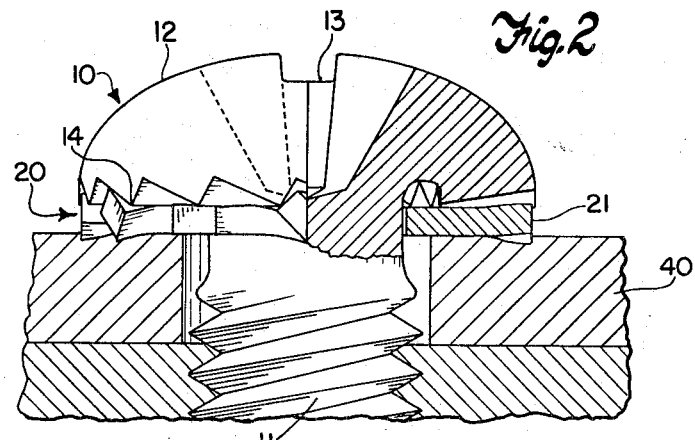
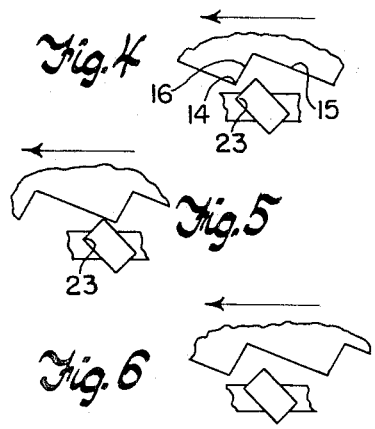
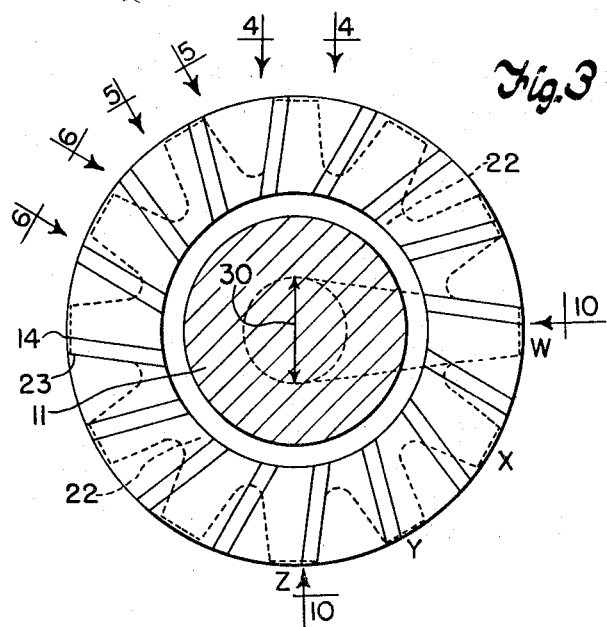
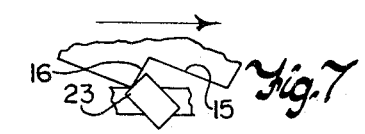
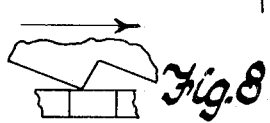
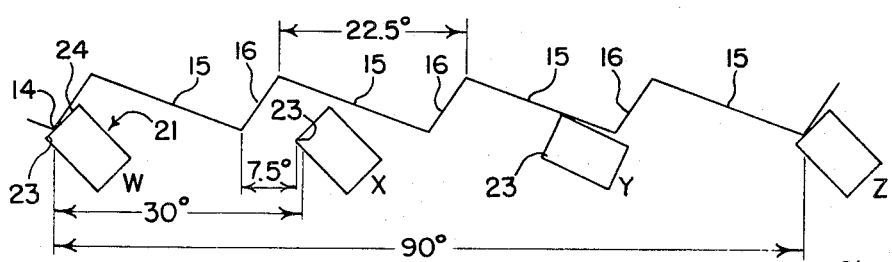
DIRECTION OF TIGHTENING
INVENTOR.
Charles E. Gutshall
BY
His Att'ys

FASTENER DEVICE

More specifically, the present invention contemplates a fastener means composed of a rotary threaded fastener having a specified number of ratchet-type configurations or cogs upon the clamping surface thereof coordinating with a lockwasher having a lesser number of radially disposed locking teeth. This invention is especially adapted to the use of lockwashers of the deflected tooth-type. Hence, the objects of this invention are to provide a novel fastener means composed of a threaded rotary clamping member and a tooth-type lockwasher which has a consistent and effective resistance to unauthorized loosening when tightened. It is also an object of this invention to provide a fastener means which will require a substantially uniform, progressively increased force or torque for tightening regardless of the position of the relative coordinating elements. It is a further object of this invention to provide coordinating surfaces between the two members whereby the teeth of the washers are prevented from being completely flattened and thereby stressed beyond their elastic limits.

The objects and advantages of this invention are accomplished by a novel relationship between the number and positions and configurations of the cogs forming the ratchet-type clamping surface of the threaded rotary member and that of the teeth of the lockwashers as will be subsequently set forth in the following detailed description of this invention in connection with the accompanying drawings, wherein:

FIG. 1 is a side elevational view of telescopically associated fastener members, namely, a rotary threaded screw member and a lockwasher illustrating one embodiment of the present invention;

FIG. 2 is an enlarged view of the upper portion of the fastener means illustrated in FIG. 1 showing a workpiece being attached by the fastener means with half of the head of the screw and lockwasher in section as well as all of the workpiece;

FIG. 3 is a horizontal transverse sectional view taken along the lines 3–3 of FIG. 1 with the lockwasher shown in phantom and depicts the relationship between the ratchet surface of the underside of the head of the threaded screw member and the teeth of the lockwasher;

FIGS. 4, 5, and 6 are fragmentary views taken from the positions shown in FIG. 3 illustrating the relationship between the ratchet surface and the teeth of the lockwasher at one particular position of the two members before tightening;

FIGS. 7, 8, and 9 are similar to FIGS. 4, 5, and 6 but in a tightened position; and FIG. 10 is a sectional view of a linear evolution of the arc 10–10 as indicated in FIG. 3 and shows a scaled relationship between corresponding elements of the two members.

Referring to the drawings in more detail, where like numerals designate similar parts throughout the entire description of this invention it will be seen that the present invention contemplates a fastener means in which elements of a rotary screw member, designated generally by the numeral 10, cooperates with elements of a sheet metal lockwasher, designated generally by the numeral 20. The number A of teeth 21 forming the lockwasher are less by B than the number of cogs C forming the ratchet surface under the head of the screw 10 so that C equals A plus B. In the disclosed embodiment, the lockwasher has twelve twisted teeth of locking prongs 21 extending outwardly and radially from an annular body portion 22 which is positioned so as to be coaxial with the screw 10. These teeth are twisted at their roots towards their free extremity such that their leading edges 23, i.e. the edge in the tightening direction along with the body of the teeth, form an acute angle with a plane at right angles to that of the axis of the screw as shown in FIGS. 4, 5, 6, 7, 9 and 10 while the trailing edges 24 form an obtuse angle therewith; however, note that the cut edges are at right angles to the body portion so that they form obtuse and acute angles, respectively. Also note that the edges are extensions of lines tangential to opposite sides of an imaginary circle whose diameter is 30 as shown in FIG. 3. The imaginary circle is concentric with the shank 11 of the screw 10.

The rotary threaded fastener 10 can be of any type and has a head element 12 and a shank 11; both are coaxial. The head is provided with a tool engaging portion 13 shown as a slot in FIG. 1. The shank may include an entering extremity 17 designed for drilling and tapping a hole in a workpiece simultaneously when tightened. The head 10 has its lower or clamping surface 18 formed from sixteen circumferentially and equally spaced cogs each having an apex 14 formed by the intersection of two camming surfaces 15 and 16. The leading camming surface 15, i.e. that in the tightening direction, inclines inwardly and in the same direction as that of the leading edge 23 of the washer. The camming surface 16, in the following direction, is inclined inwardly but in an opposite direction from that of 15 and is shorter and steeper. It will be noted from FIG. 3 that the apices 14 are actually lines which extend outwardly and generally tangential to the same imaginary circle having the diameter 30 and from the same positions as the leading edges of the teeth of the lockwasher.

Referring now to FIGS. 4—10, it will be seen that the cam surface 15 on a cog is in sliding relationship with the leading edge 23 of a tooth 21 as shown in position X, FIG. 10 during the tightening of the screw 10. However, position Y shows the relationship of the complementary surfaces in a clamping position with the tooth 21 forced by the apex 14 and the camming surface 15 against the surface of the workpiece 40. Note that simultaneously the cut edge of the leading edge 23 of the teeth 21 contacts the apex 14 and the camming surface in position W is in a line contact for in this position both are cotangent, this also gives a ratchet-type resistance to unauthorized loosening of the screw. However, since the camming surface 16 and the cut edge portion of the leading edge 23 of the tooth 21 of the washer slants towards the loosening direction, the locking action as depicted in position W can be overcome by applying a torque to the head of the screws substantially greater than that which may cause unauthorized loosening without destroying the capability of the various complementary elements to be retightened. As shown in FIG. 10, the tooth in position X is free and unengaged; however, if the screw is turned a very short distance, it will engage the adjacent apex.

In the preferred embodiment of this invention, there are 16 apices on the head of the screw which are thus spaced 22½° apart. There are 12 teeth on the lockwasher which are spaced 30° apart hence there will be a cotangent contact, position W, every 90° or four times for each complete turn. Thus, there are always four duplicate positions for each of the coordinating parts. Since the spacing of the cogs are 22½° apart and there are three teeth between each cotangent position, then there is a duplication of the position shown in FIG. 10 every 7½°. Thus the Y—W positions, i.e., the positions for maximum tightening, is reached every 7½° though a movement in either direction will require a force which clearly illustrates one of the outstanding advantages of this invention that there is a substantially uniform progressively increased resistance to torque during tightening. Thus regardless of the exact position the coordinating parts may terminate after tightening, there is a locking position which will resist unauthorized loosening. Particularly note in FIG. 10 that in order for the apex 14 to become loosened in the W position, the tooth 21 must be depressed which would require considerable force and a substantial arc movement is required before the tooth is released from the depressed position.

While the 16 cogs are used for C in the above description and 12 teeth for A with a difference of four for B, it is within the scope of this invention to substitute other values in the equation C equals A plus B such for example as those shown in the following table.

EXAMPLES OF SPACING OF COGS AND TEETH

| C<br>No. and spacing of cogs on°<br>head, | A<br>No of teeth on lockwasher | B<br>Difference | Interval between cotangent positions, ° | Number of cotangent positions per turn | Lockwasher, teeth per interval | Arc difference between cotangent positions, ° |
|---|---|---|---|---|---|---|
| 12–30 | 8 | 4 | 90 | 4 | 2 | 15 |
| 12–30 | 9 | 3 | 120 | 3 | 3 | 10 |
| 15–24 | 12 | 3 | 120 | 3 | 4 | 6 |
| 16–22.5 | 10 | 6 | 180 | 2 | 5 | 4.5 |
| 16–22.5* | 12 | 4 | 90 | 4 | 3 | 7.5 |
| 18–20 | 12 | 6 | 60 | 6 | 2 | 10 |
| 18–20 | 15 | 3 | 120 | 3 | 5 | 4 |

*Example used in the description of the invention.

It is desirable that there be at least three duplicate positions at any one time and the calculation of such positions can be determined by the example set forth above. In any case, the number of lugs and teeth should not exceed the space needed to give satisfactory holding power. Commercial application of this invention has clearly demonstrated that the above advantages attained by having the cogs on the clamping surface of a screw greater in number than that of the teeth on a coordinating lockwasher whereby there are only a few locations such as four and no less than about three at any one time in which the coordinating parts are in the exact same position. Also, positions of maximum resistance to unauthorized loosening are reached with only a short turn of the screw which places other portions of the coordinating member in a similar maximum resistance position thereby giving a uniform progressively increased resistance to torque during tightening. Note from FIG. 3 that this maximum resistance to torque is a line contact between the apex 14 and the leading edge 23 of a tooth.

In the drawing and the above description, an exterior type lockwasher is shown, i.e., the teeth extend radially outwardly from an annular element, it is also within the scope of this invention to position the annular element in a circumvential position and have the teeth extend inwardly but still radially and also tangential to the imaginary circle thus forming an interior-type lockwasher.

In order to be assured that the teeth of the washer are not completely flattened and thereby exceed its elastic limit and hence not reusable, it is desirable to form the undersurface of the head of the screw with a very slight upwardly and outwardly taper from a radial plane extending normal to the shank of the screw. Obviously, it should not be to such as extent that there is no engagement of the coordinating parts.

It is apparent from the above description that a novel and very practical fastener means has been invented which can be economically made and which not only has high resistance to unauthorized loosening but also has a substantial uniform progressively increased resistance to torque, such fastener being well adapted from any use where there is a telescopic relationship between a rotary threaded type fastener and a lockwasher.

I claim:

1. A fastener means including, in combination, a rotary threaded fastener member including a head element and a shank portion integrally and coaxially disposed with respect to said head element, a ratchet-type clamping surface with C number of equally spaced cogs integrally formed with, and circumferentially spaced under said head element and a sheet metal lockwasher operatively associated with said clamping surface, said lockwasher including an annular body concentric with said threaded shank having A number of integral circumferentially spaced teeth with the leading and trailing edges of said teeth forming an extension of lines generally tangent to opposite points on the circumference of an imaginery circle concentric with said shank portion, said teeth inclined in a direction such that the leading edge and body thereof forms an acute angle with a plane normal to the axis of said fastener member in the tightening direction, the number of cogs C in said ratchet-type clamping surface exceeding the number of teeth A in said lockwasher by B whereby C equals A plus B, each of said cogs including an apex defined by a line contact of two angularly disposed camming surfaces with each said apex being generally tangent to the said imaginery circle on the same side thereof as the leading edge of said teeth whereby there are less than A number of leading edges of lockwasher teeth in cooperating alignment with a corresponding number of apices of cogs at the same time there are also less than A number of leading edges of teeth in intersecting arrangement with a corresponding number of apices of cogs to provide substantially uniform progressively increased resistance to torque during tightening, the angle of inclination of said camming surface which is on the leading side of said apex being inclined in the same direction as said teeth to permit sliding engagement therewith and the camming surface on the trailing side of said apex inclined in the opposite direction and of a shorter distance to facilitate locking engagement.

2. A fastener means set forth in claim 1 in which A equals 12, B equals 4, and C equals 16.

3. The fastener means set forth in claim 1 in which A equals 12, B equals 3, and C equals 15.

4. The fastener means set forth in claim 1 in which A is 8 to 15, B is 3 to 6, and C is 12 to 18, and the number of cotangent positions per turn are between 2 to 6.

5. The fastener means set forth in claim 1 in which said cogs extend slightly upwardly and outwardly from a plane normal to the axis of said fastener means at the inner position of said cogs.

6. The fastener means set forth in claim 1 in which said teeth extend inwardly from a circumferential position of said annular body.